(12) United States Patent
Rasche

(10) Patent No.: US 8,340,442 B1
(45) Date of Patent: Dec. 25, 2012

(54) LOSSY COMPRESSION OF HIGH-DYNAMIC RANGE IMAGE FILES

(75) Inventor: Karl Richard Rasche, Albany, CA (US)

(73) Assignee: Pacific Data Images LLC, Redwood City, CA (US)

( * ) Notice: Subject to any disclaimer, the term of this patent is extended or adjusted under 35 U.S.C. 154(b) by 346 days.

(21) Appl. No.: 12/705,348

(22) Filed: Feb. 12, 2010

(51) Int. Cl.
 *G06K 9/36* (2006.01)
 *G06K 9/40* (2006.01)
 *G06K 9/46* (2006.01)

(52) U.S. Cl. ...................... 382/232; 382/254

(58) Field of Classification Search .......... 382/166, 382/167, 232, 244–246, 250, 251, 254, 260–264, 382/274, 276, 294; 345/419, 555, 589, 614, 345/617, 629, 648, 660; 348/229.1, 294, 348/E09.01; 358/518, 523
See application file for complete search history.

(56) References Cited

U.S. PATENT DOCUMENTS

| | | | | |
|---|---|---|---|---|
| 7,142,723 B2* | 11/2006 | Kang et al. | ..................... | 382/254 |
| 7,174,039 B2* | 2/2007 | Koo et al. | ..................... | 382/154 |
| 7,433,514 B2* | 10/2008 | Sloan | ........................... | 382/167 |
| 7,489,814 B2* | 2/2009 | Spitzer et al. | ................. | 382/167 |
| 7,783,121 B1* | 8/2010 | Cox | ............................. | 382/254 |
| 7,932,914 B1* | 4/2011 | Geiss et al. | ..................... | 345/660 |
| 7,961,983 B2* | 6/2011 | Uyttendaele et al. | ......... | 382/294 |
| 2008/0192132 A1* | 8/2008 | Bechtel et al. | ............... | 348/294 |

OTHER PUBLICATIONS

Commission Internationale de l'Eclairage Proceedings, Cambridge University Press, Cambridge, 1931, Retrieved on Apr. 5, 2010, Webpage available at: http://en.wikipedia.org/wiki/CIE_1931_color_space.

Manders et al., "A Compression Method for Arbitrary Precision Floating-Point Images", Proceedings of the IEEE International Conference on Image Processing, 2007, pp. IV-165-IV-168.

Mantiuk et al., "Backward compatible high dynamic range MPEG video compression", ACM Transactions on Graphics, vol. 25, No. 3, Jul. 2006, pp. 713-723.

Mantiuk et al., "Lossy compression of high dynamic range images and video", Proceedings of Human Vision and Electronic Imaging XI, vol. 6057 of proceedings of SPIE, 60570V, Feb. 2006, 10 pages.

Mantiuk et al., "Perception-motivated high dynamic range video encoding", ACM Transactions on Graphics, vol. 23, No. 3, Aug. 2004, pp. 733-741.

Ward et al., "JPEG-HDR: A Backwards-Compatible, High Dynamic Range Extension to JPEG", Thirteenth Color Imaging Conference, Nov. 2005, 8 pages.

(Continued)

*Primary Examiner* — Amir Alavi
(74) *Attorney, Agent, or Firm* — Morrison & Foerster LLP

(57) ABSTRACT

A high dynamic range (HDR) image can be lossy compressed by first mapping floating point image data values of the HDR image from a light linear space to a perceptually linear space using a first non-linear mapping function. A value in the light linear space is proportionate to the power of a light source, and a value in the perceptually linear space is proportionate to a visual perceived brightness. Floating point discrete cosine transform (DCT) frequency coefficients of the floating point image data values of the HDR image are determined. The floating point DCT frequency coefficients are quantized. The quantized floating point DCT frequency coefficients are compressed. The compression of the quantized floating point DCT frequency coefficients is lossless. The compressed quantized floating point DCT frequency coefficients are stored.

19 Claims, 4 Drawing Sheets

OTHER PUBLICATIONS

Ward et al., "Subband encoding of high dynamic range imagery", Applied Perception in Graphics and Visualization, vol. 73, 2004, pp. 83-90.

Xu et al., "High-Dynamic-Range Still-Image Encoding in JPEG 2000", IEEE Computer Graphics and Applications, vol. 25, No. 6, 2005, pp. 57-64.

Xu, Ruifeng, "Real-Time Realistic Rendering and High Dynamic Range Image Display and Compression", Ph. D. Thesis, School of Computer Science, University of Central Florida, Dec. 2005, 192 pages.

* cited by examiner

LOSSY COMPRESSION OF HIGH-DYNAMIC RANGE IMAGE FILES

BACKGROUND

1. Field

This application relates generally to image compression, and more specifically to lossy compression of high dynamic range (HDR) images.

2. Related Art

High dynamic range (HDR) images have a wider dynamic range (i.e., the ratio between the brightest and darkest parts of a scene) than low dynamic range (LDR) images. The wider dynamic range allows the preservation of details that may be lost due to limiting contrast ratios. Rendered images of computer animated motion pictures or computer games are often HDR images, because HDR images create more realistic scenes.

In general, HDR images use a higher number of bits per color channel than LDR images to represent many more colors over a much wider dynamic range. Typically, a 16-bit or 32-bit floating point number is used to represent each color component of an HDR pixel.

Typically, HDR images encode as image data the actual physical values of luminance or radiance of the scene being depicted. The encoded image data is meant to describe the state of the image when captured. Such an image is variously described as an input-referred, scene-referred, or focal-plane-referred image. For example, an HDR image capturing the full range of luminance values in a sunlit scene containing sand or snow in full sun and other objects in deep shadow may have a dynamic range exceeding 100,000:1.

In contrast, LDR images are generally output-referred (also known as device-referred) images. LDR images contain data that is dependent on the particular display devices, such as cameras, LCD monitors, and video projectors. For example, a digital single lens reflex 35 mm camera, such as the Canon EOS-1D Mark II, may have a dynamic range of 2048:1, and a computer LCD display may have a dynamic range of 1000:1. Therefore, two LDR images shown using two different display devices may differ, as the data is meant to describe the performance of the particular display device under a certain set of viewing conditions.

Image compression is the application of data compression to a digital image, to reduce the number of bits necessary to represent the image. Image compression may be lossy or lossless. In lossy compression, there is irreversible loss of information during compression encoding, such that it is generally not possible to reconstruct an exact replica of the original uncompressed image after decoding. However, the reconstructed image may be acceptable and useful for many applications, and lossy compression has the advantage of producing potentially greater reduction in data rate than lossless compression.

In recent years, there has been a growing body of work examining the problem of lossy compression of HDR image files. One approach is to convert HDR image data from a floating point format to a limited-range integer format and then compress the converted data using traditional compression techniques, such as MPEG (Moving Picture Experts Group) or JPEG (Joint Photographic Experts Group) compression.

For example, an approach by Mantiuk et al. converts HDR image data from a floating point format to an integer format by using a mapping that accounts for the human visual system's perception of luminance. The converted data is then compressed using MPEG-based compression. (See, e.g., Rafal Mantiuk, Alexander Efremov, Karol Myszkowski, Hans-Peter Seidel, "Backward compatible high dynamic range MPEG video compression," *ACM Transactions on Graphics*, v.25 n.3 (July 2006); Rafal Mantiuk, Grzegorz Krawczyk, Karol Myszkowski, Hans-Peter Seidel, "Perception-motivated high dynamic range video encoding," *ACM Transactions on Graphics*, v.23 n.3 (August 2004); Rfal Mantiuk, Karol Myszkowski, and Hans-Peter Seidel, "Lossy compression of high dynamic range images and video," *Proc. of Human Vision and Electronic Imaging XI*, vol. 6057 of Proceedings of SPIE, 60570V (February 2006).) A similar approach by Xu et al. uses JPEG 2000 compression. (See Ruifeng Xu, Sumanta N. Pattanaik, Charles E. Hughes, "High-Dynamic-Range Still-Image Encoding in JPEG 2000," *IEEE Computer Graphics and Applications* 25(6): 57-64 (2005).) These approaches have a number of drawbacks. For MPEG or JPEG compression, the bit depth per color channel (the number of bits used to represent a color component of a pixel) is limited; therefore, precision is traded off against dynamic range. In addition, the perceptual mappings proposed by Mantiuk et al. are insufficient for storing high-quality output-referred images. For JPEG 2000 compression, higher bit depth compression is available, but JPEG 2000 is a relatively complex implementation and has the disadvantage of being slow to run. In both cases, compressing negative numbers is a challenge without storing additional information.

An alternative approach is to extract an LDR image from the source HDR image and include additional data for recovering the original image. The LDR image is then compressed using traditional techniques, and the recovery information is compressed separately. This approach also has a number of drawbacks.

For example, Ward and Simmons proposed a variant of this strategy that is backwards compatible with LDR JPEG decoders. The LDR image is extracted from the source HDR image by a tone-mapping operation, and the additional data for recovering the original image is extracted and stored in auxiliary locations of a JPEG file. The disadvantage of this approach is the overhead of performing the tone-mapping operation during the encoding stage. (See, e.g., Greg Ward, Maryann Simmons, "Subband encoding of high dynamic range imagery," *APGV* 2004: 83-90; Greg Ward, Maryann Simmons, "JPEG-HDR: A backwards-compatible, high dynamic range extension to JPEG," Thirteenth Color Image Conference (November 2005).)

In another example, an approach by Xu first represents the HDR image in an RGBE (Red, Green, Blue, and Exponent) format, which stores pixels as an RGB (red, green, and blue) tri-value, one byte per color component, with a one byte shared exponent E. The LDR image is then extracted from the source HDR image by treating the RGB as the LDR portion. The exponent is then compressed separately. The approach has the disadvantage of imprecision which results from the use of RGBE encoding. (See Ruifeng Xu, Real-Time Realistic Rendering and High Dynamic Range Image Display and Compression, Ph.D. thesis, School of Computer Science, University of Central Florida (December 2005).)

In yet another strategy, an approach by Manders et al. compresses the low-byte of the floating point values in the HDR image directly. However, this approach offers limited control of the compression ratio and the trade-off between the compression rate and image quality. (See Corey Manders, Steve Mann, and Farzam Farbiz, "A Compression Method for Arbitrary Precision Floating-Point Images," Proceedings of the 2007 International Conference on Image Processing (2007).)

SUMMARY

In one exemplary embodiment, a high dynamic range (HDR) image can be lossy compressed by first mapping floating point image data values of the HDR image from a light linear space to a perceptually linear space using a first non-linear mapping function. A value in the light linear space is proportionate to the power of a light source, and a value in the perceptually linear space is proportionate to a visual perceived brightness. Floating point discrete cosine transform (DCT) frequency coefficients of the floating point image data values of the HDR image are determined. The floating point DCT frequency coefficients are quantized. The quantized floating point DCT frequency coefficients are compressed. The compression of the quantized floating point DCT frequency coefficients is lossless. The compressed quantized floating point DCT frequency coefficients are stored.

BRIEF DESCRIPTION OF THE FIGURES

The present application can be best understood by reference to the following description taken in conjunction with the accompanying drawing figures, in which like parts may be referred to by like numerals.

DETAILED DESCRIPTION

The following description sets forth numerous specific configurations, parameters, and the like. It should be recognized, however, that such description is not intended as a limitation on the scope of the present invention, but is instead provided as a description of exemplary embodiments.

Figure 1:
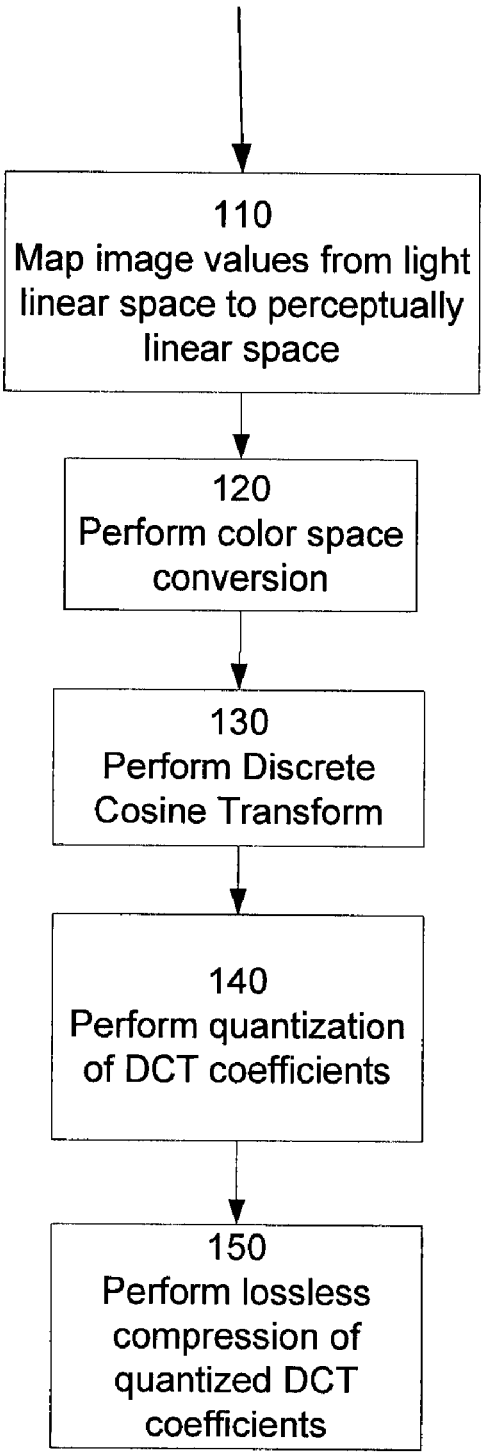
FIG. 1 illustrates an exemplary process for lossy compression of HDR images.

FIG. 1 shows an exemplary process 100 for the lossy compression of HDR images at high quality levels. At 110, the image data values of HDR images are mapped from a light linear space to a perceptually linear space. At 120, a color space conversion is performed on color images (this step is skipped for grayscale images). At 130, a forward discrete cosine transform (DCT) of the image data is computed, and quantization of results of the DCT is performed at 140.

Together, blocks 130 and 140 achieve a significant share of the compression data reduction. At 150, a lossless compression of the quantized DCT coefficients is performed. Each of these steps is now described in greater detail.

At 110, the image data values of a HDR image are mapped from a light linear space to a perceptually linear space. A light linear space is the space in which the power of a light source, as may be measured by the number of photons emitting from the source, is measured. In order to accommodate the wide dynamic range of light sources, from the midday sun to candlelight, the human eye's perception of brightness is not linear with respect to the power of a light source. However, compression is more efficient if carried out on image data that are represented in a perceptually linear space, i.e., a space in which the values of the image data vary (approximately) linearly in proportion to what the human eye perceives as being their brightness.

The perceptually linear space designed for images with different dynamic ranges may be different. For LDR and output-referred images, the light linear space to perceptually linear space mapping is often expressed by the following function (sometimes slightly modified):

$$p_{LDR}(x) = \begin{cases} 12.92x & x \leq 0.00304 \\ 1.055x^{1/2.4} - 0.055 & \text{otherwise} \end{cases}$$

where $p_{LDR}(x)$ is a perceptually linear value, and x is a light linear value of LDR image. (See ISO/IEC 61966-2-1, colour measurement and management in multimedia systems and equipment-part 2-1: Default RGB colour space—sRGB.) Alternatively, a power function, which has a simpler form and different behavior for small values of x, may be used:

$$p_{LDR}(x) = x^{1/2.2}$$

For HDR and input-referred images, light linear data may take on a much wider range of values, and a power function ($f(x)=x^a$) may grow too quickly at larger light linear values (x) to be optimal as the mapping. Therefore, the light linear space to perceptually linear space-mapping for HDR or input-referred images is often expressed by a logarithmic function:

$$p_{HDR}(x) = \ln(x)$$

where $p_{HDR}(X)$ is a perceptually linear value and x is a light linear value of a HDR image. However, one drawback of a logarithmic mapping is that very small light linear values (x) are over-emphasized, i.e., they are mapped to large negative perceptually linear values.

In an exemplary embodiment, a piecewise power and logarithmic function is used for the mapping of HDR images:

$$p_{HDR}(x) = \begin{cases} x^{1/2.2} & x \leq 1 \\ \log_{e^{2.2}}(x) + 1 & \text{otherwise} \end{cases}$$

This piecewise power and logarithmic function has the advantages of not overemphasizing very small light linear values, unlike a pure logarithmic function; neither does it grow too quickly as light linear values become very large, unlike a pure power function. Those of ordinary skill in the art will recognize that other mappings from a light linear space to a perceptually linear space are possible.

After the image data of HDR images has been mapped from a light linear space to a perceptually linear space, color space conversion may be performed for color images at 120 (this step may be skipped for grayscale images). It has been shown that the representation of any color may be expressed as a linear combination of three components. (See *Commission internationale de l'Eclairage proceedings*, Cambridge University Press, Cambridge (1931).) The most common color space is the R' G' B' space, which is used in consumer digital still cameras, high-definition video cameras, computer monitors, high-definition televisions, and the like. The R' G' B' space is a perceptual mapping of the RGB space, the latter expressing an arbitrary color as an additive combination of different intensities of three primary colors: red, green, and blue.

Compression is more efficiently performed in a different color space, the Y' CbCr space. Y' is the luma, proportional to the perceptual intensity of the light source, and Cb and Cr are the chroma, representing color in terms of the presence or absence of blue and red, respectively, for a given luma intensity. Compression is aided by first converting from an R' G' B' space to a Y' CbCr space because the human eye is sensitive to small changes in luma, but less so to changes in chroma, allowing chroma values to selectively undergo greater compression without visually apparent degradation in image quality. In one exemplary embodiment, color image data in the R' G' B' space may be mapped to the Y' CbCr space through a transform based on the ITU BT.709 primaries (see ITU-R Recommendation BT.709, Basic parameter values for the HDTV standard for the studio and for international programme exchange, 1990):

$$\begin{bmatrix} Y' \\ Cb \\ Cr \end{bmatrix} = \begin{bmatrix} 0.2126 & 0.7152 & 0.0722 \\ -0.1146 & -0.3854 & 0.5000 \\ 0.5000 & -0.4542 & -0.0458 \end{bmatrix} \begin{bmatrix} R' \\ G' \\ B' \end{bmatrix}$$

At 130, a forward discrete cosine transform (DCT) of the Y' CbCr data is computed. It should be recognized that the DCT is performed in floating point to preserve the range of the inputs. First, the pixels of each color component (Y', Cb and Cr) are grouped into data units. In JPEG, for example, the data unit is an 8×8 block of pixels for a color component. If the number of rows and/or columns of the image is not a multiple of eight, then the bottom row and/or rightmost column may be replicated as many times as needed. The DCT is then applied to each data unit, producing an n×n block of DCT frequency coefficients for each data unit. For JPEG, n equals 8 and the DCT is given by:

$$F_{i,j} = \frac{1}{4} C_i C_j \sum_{x=0}^{7} \sum_{y=0}^{7} p_{x,y} \cos\left(\frac{(2x+1)i\pi}{16}\right) \cos\left(\frac{(2y+1)j\pi}{16}\right),$$

$$C_k = \begin{cases} \frac{1}{\sqrt{2}}, & k = 0, \\ 1, & k > 0, \end{cases} \quad 0 \leq i, j \leq 7$$

where $F_{i,j}$ is the (i, j)-th DCT frequency coefficient and $p_{x,y}$ is the (x, y)-th pixel color component value. The output of the JPEG DCT, then, is an 8×8 transform coefficient matrix in which the image signal has been decomposed by frequency: the (0,0)-th DCT frequency coefficient is the DC (or zero frequency) component and DCT frequency coefficients with increasing indices correspond to higher horizontal and vertical spatial frequencies.

Image compression generally relies on the observation that the data in most images are correlated. For example, if a pixel in an image represents a small portion of blue sky, then it is likely that neighboring pixels will have similar color component values. The DCT has the useful property that upon applying the transform to correlated input data, most of the signal information tends to become concentrated in a few low-frequency coefficients of the DCT. Therefore, image compression with the DCT may be done by quantization of the coefficients. For example, by using fewer bits to represent the coefficients, data reduction is achieved. The large, low frequency coefficients containing more important image information may be quantized finely to maximize image quality, whereas the small, high-frequency components containing less important image information may be quantized coarsely and possibly rounded to zero, to maximize data reduction.

In JPEG, quantization is typically performed using two 8×8 quantization tables, one for the luma (or grayscale) component and the other for both chroma components. The quantization tables are constructed from knowledge of perceptual sensitivity to changes in different frequencies. Each element in the 8×8 quantization table specifies the divisor to be used for the corresponding coefficient in the 8×8 DCT output matrix. Thus, the quantization technique in JPEG consists of dividing each frequency coefficient in the DCT output by the corresponding quantization table divisor and rounding to the nearest integer. For illustration purposes, a typical quantization table as specified in the JPEG standard is as follows:

$$\begin{bmatrix} 16 & 11 & 10 & 16 & 24 & 40 & 51 & 61 \\ 12 & 12 & 14 & 19 & 26 & 58 & 60 & 55 \\ 14 & 13 & 16 & 24 & 40 & 57 & 69 & 56 \\ 14 & 17 & 22 & 29 & 51 & 87 & 80 & 62 \\ 18 & 22 & 37 & 56 & 68 & 109 & 103 & 77 \\ 24 & 35 & 55 & 64 & 81 & 104 & 113 & 92 \\ 49 & 64 & 78 & 87 & 103 & 121 & 120 & 101 \\ 72 & 92 & 95 & 98 & 112 & 100 & 103 & 99 \end{bmatrix}$$

As shown in the quantization table above, the divisors for the higher frequency coefficients generally have larger values than those for the lower frequency coefficients. As a result, it is typically the case that after quantization, many of the higher frequency components are rounded to zero and many of the rest to small numbers, which take fewer bits to store.

The JPEG quantization technique works well for low dynamic range or output-referred images, where the input values are integers. However, the technique does not readily extend to high dynamic range or input referred images, in which the input values (and the DCT coefficients) are floating point numbers. Floating point numbers are typically represented as 16-bit (half-float), 32-bit (single precision) or 64-bit (double precision) values, consisting of a mantissa (or significand) and a signed integer exponent. Direct application of the JPEG quantization technique to a floating point DCT frequency coefficient—dividing by the quantization table divisor and rounding to the nearest integer—just results in another floating point value. Manders et al. have proposed compressing the low-byte of the floating point values in the HDR image directly; however, such an approach offers limited control of the compression ratio.

Figure 2:
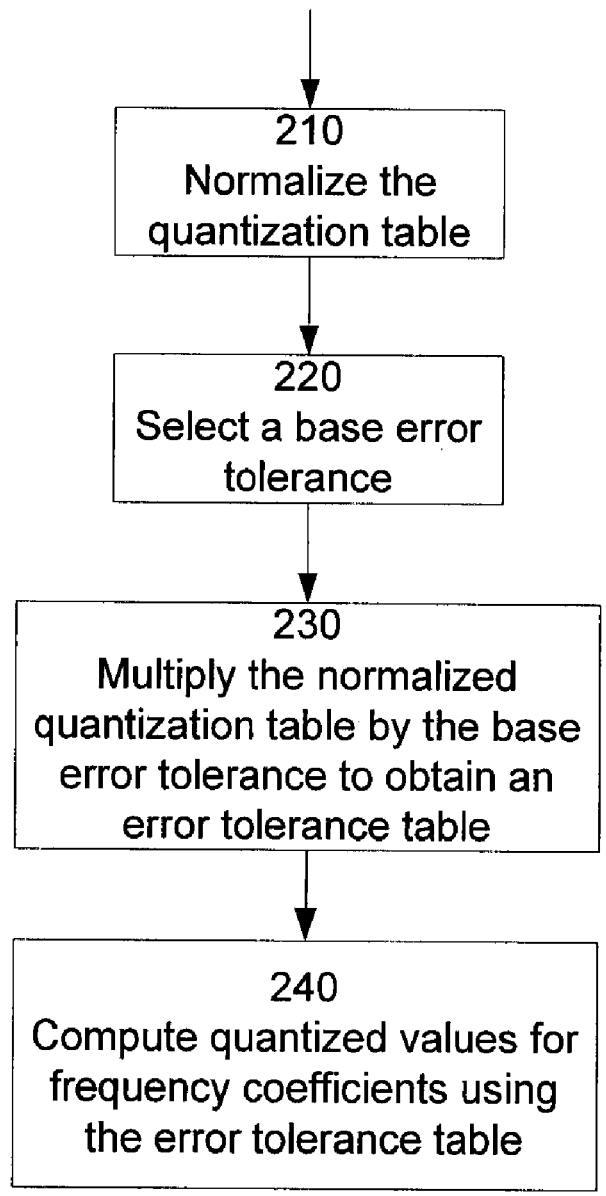
FIG. 2 illustrates an exemplary process for the quantization of discrete cosine transform (DCT) coefficients.

FIG. 2 illustrates an improved process 200 for quantization, which is effective for high dynamic range and input referred images. At 210, the quantization table is normalized. In one exemplary embodiment, the JPEG luma quantization table (see the quantization table in paragraph [0030]) is chosen as the initial quantization table, and by dividing all of the coefficients by 10, a normalized quantization table is produced as follows:

$$\begin{bmatrix} 1.6 & 1.1 & 1.0 & 1.6 & 2.4 & 4.0 & 5.1 & 6.1 \\ 1.2 & 1.2 & 1.4 & 1.9 & 2.6 & 5.8 & 6.0 & 5.5 \\ 1.4 & 1.3 & 1.6 & 2.4 & 4.0 & 5.7 & 6.9 & 5.6 \\ 1.4 & 1.7 & 2.2 & 2.9 & 5.1 & 8.7 & 8.0 & 6.2 \\ 1.8 & 2.2 & 3.7 & 5.6 & 6.8 & 10.9 & 10.3 & 7.7 \\ 2.4 & 3.5 & 5.5 & 6.4 & 8.1 & 10.4 & 11.3 & 9.2 \\ 4.9 & 6.4 & 7.8 & 8.7 & 10.3 & 12.1 & 12.0 & 10.1 \\ 7.2 & 9.2 & 9.5 & 9.8 & 11.2 & 10.0 & 10.3 & 9.9 \end{bmatrix}$$

Other values for the divisor used to normalize the table may also be used. The values of the coefficients in the normalized table then specify the relative error tolerances across the frequency components. For example, as shown in the exemplary normalized quantization table above, the relative error tolerance for the DC frequency component is small compared to those for higher frequency components. By being compatible with many of the steps of the JPEG image compression standard, such as the use of the JPEG luma quantization table and the JPEG adopted DCT, the technique can thereby leverage much of the existing technologies already developed for the JPEG standard.

At 220, a base error tolerance is chosen. In one exemplary embodiment, the error tolerance is chosen as a user-specifiable parameter. It may represent the amount of error that can be tolerated in the most sensitive frequency component, e.g., the DC frequency component.

In one exemplary embodiment, an automatic error scaling metric is used to adapt the user-chosen base error tolerance level, so that two different scalings of the same data would be compressed equally. This can be achieved, for example, by examining the DC coefficients of the data units of the image and computing a simple or a weighted average of the DC coefficients. This metric serves as a predictor of the overall image brightness, and can be used to scale the user error tolerance so that the quantization (and compression) of an image is invariant to its absolute brightness level. It will be recognized that other techniques of computing the automatic error scaling metric are also possible, for example, by sampling the luma levels in different areas of the image and computing a simple or weighted average of the sampled luma values.

At 230, the normalized quantization table is multiplied by the base error tolerance to obtain an error tolerance table containing the absolute error tolerance for each frequency component. In an exemplary embodiment, a base error tolerance of 0.00045 is chosen to scale the normalized quantization table, producing a per-frequency coefficient error tolerance table as follows:

$$\begin{bmatrix} .00072 & .000495 & .00045 & .00072 & .00108 & .0018 & .0023 & .00275 \\ .00054 & .00054 & .00063 & .000855 & .00117 & .00261 & .0027 & .00248 \\ .00063 & .000585 & .00072 & .00108 & .0018 & .00257 & .00311 & .00252 \\ .00063 & .000765 & .00099 & .00131 & .0023 & .00392 & .0036 & .00279 \\ .00081 & .00099 & .00163 & .00252 & .00306 & .00491 & .00464 & .00347 \\ .00108 & .00158 & .00248 & .00288 & .00365 & .00468 & .00509 & .00414 \\ .00221 & .00288 & .00351 & .00392 & .00464 & .00545 & .0054 & .00455 \\ .00324 & .00414 & .00428 & .00441 & .00504 & .0045 & .00464 & .00446 \end{bmatrix}$$

At 240, for each frequency coefficient F of each data unit, a value F' lying within the per-frequency coefficient absolute error tolerance is computed such that by replacing F with F', a smaller compressed file size may be achieved. F', then, is the quantized value corresponding to F. It should be recognized that the quantized output F' remains a floating point value. By not requiring the conversion of HDR image data from a floating point format to an integer format or the extraction of an LDR image from the source HDR image during compression, this technique avoids the aforementioned drawbacks of such approaches. Instead, this technique provides the ability to directly compress the floating point values of HDR image data, such as the half precision floating point values used in the OpenEXR HDR file format.

In one exemplary embodiment, for a given frequency coefficient F and a corresponding per-frequency coefficient absolute error tolerance e, the value F' is chosen so as to maximize the number of bits set in its binary floating point representation (for example, IEEE 754 Standard for Floating-Point Arithmetic), subject to the constraint that F' lies between F−e and F+e. In the preferred embodiment, for a given frequency coefficient F and a per-frequency coefficient absolute error tolerance e, the value F' is chosen so as to minimize the number of bits set in its binary floating point representation, subject to the constraint that F' lies between F—e and F+e. There may be many binary floating point numbers that lie in the interval between F—e and F+e which are possible candidates to be F'; hence, for 32-bit and larger floating-point numbers, the optimization problem of computing F' can have a very large solution space. Further, the selecting of F' is not a well-behaved function of F. Therefore, well-known constrained optimization techniques are not directly applicable, so that the search for the optimal quantized value F' may be computationally expensive.

In one exemplary embodiment, frequency coefficients represented as high-precision floating point numbers are first rounded down to lower precision floating point numbers before proceeding to solve the constrained optimization problem of computing F' given F and e. For example, a 32-bit floating point representation of F may be first rounded down to a 16-bit floating point representation, and a 64-bit floating point representation may be rounded down to either a 32-bit or a 16-bit value.

In one exemplary embodiment, the search for a quantized value F' given F and e is optimized by pre-computation so as to minimize the computational effort required. For purpose of illustration, F is assumed to be a 16-bit floating-point number (those of ordinary skill in the art will recognize that other precisions are also possible for F). For 16-bit floating-point numbers, the number of bits set in F' (i.e., the output of the function countSetBits(F)) has a maximum value of 16, since there are only 16 bits in F'. For each distinct output of the function countSetBits( ) (for example, the values 0, 1, . . . , 16 in the case of 16-bit floating-point numbers), there is a value of F' which minimizes the quantization error (|F−F'|), wherein |F−F'| denotes the absolute value of the difference between F and F'. Other metrics for the quantization error are also possible; for example, $|F-F'|^n$, where n is a positive value. If there are two potential solutions, A and B, where:

countSetBits($A$)=countSetBits($B$), then the solution with the lower quantization error is preferred. This can be used to pre-compute the solution set as follows: for each value of F and a given value of countSetBits (F'), compute the quantized value F', which minimizes the quantization error |F−F'|. For 16-bit floating-point precision, there are $2^{16}$ possible values for F, and each value of F has at most 17 possible corresponding values for F', one for each distinct value of the function countSetBits( ). The pre-computed table only needs to be computed once and the results then stored, allowing the computation of the table to be performed offline by exhaustive search.

Table 1 illustrates an exemplary pre-computed table for 16-bit floating point precision values that may be used to find the optimal quantized value $F_{optimal}'$ given the input floating point value F and the absolute per frequency coefficient error tolerance e:

TABLE 1

| Input value F | F' | \|F − F'\| |
|---|---|---|
| ○ | ○ | ○ |
| ○ | ○ | ○ |
| ○ | ○ | ○ |
| 9.640625 | 0.000000 | 9.640625 |
|  | 2.000000 | 7.640625 |
|  | 8.000000 | 1.640625 |
|  | 10.000000 | 0.359375 |
|  | 9.500000 | 0.140625 |
|  | 9.625000 | 0.015625 |
|  | 9.640625 | 0.000000 |
| ○ | ○ | ○ |
| ○ | ○ | ○ |
| ○ | ○ | ○ |

The input value F may be used to form a hash key, an address, or an index for looking up the pre-computed table. For each value F, there are up to 17 corresponding table entries, one for each distinct value of the function countSetBits( ). Each table entry consists of a quantized value F' and the corresponding quantization error |F−F'|. Each table entry may optionally also include a field for countSetBits(F'), the number of bits set in F'. The search for the optimal quantized value $F_{optimal}'$, consists of examining up to 17 table entries and selecting the F' with the fewest number of bits set which satisfies the constraint |F−F'|≦e.

In one exemplary embodiment, the entries corresponding to each input value F are sorted in increasing order of countSetBits(F') as part of the pre-computation step. The search for $F_{optimal}'$ may then be performed by a sequential or binary search which halts after the first potential solution is found satisfying the constraint |F−F'|≦e.

The operation of 240 may be illustrated by example for the following matrix of DCT coefficients F in 16-bit floating point representation:

$$\begin{bmatrix} 9.6406 & -1.1475 & -0.4817 & 0.6729 & -0.2581 & -0.1675 & -0.0447 & 0.0763 \\ -1.8193 & 1.3252 & 0.3738 & -0.8208 & 0.4395 & 0.0664 & -0.0722 & -0.0977 \\ 0.5249 & -0.7935 & 0.1035 & 0.1233 & -0.2299 & -0.0083 & -0.0083 & 0.0226 \\ 0.1006 & -0.2705 & 0.3594 & 0.1747 & -0.2649 & 0.0336 & 0.1367 & 0.0143 \\ -0.4287 & 0.5376 & -0.0038 & -0.2952 & 0.2341 & -0.1017 & -0.0177 & 0.0152 \\ 0.3286 & -0.2598 & -0.2561 & 0.2043 & 0.0315 & 0.0281 & -0.0285 & -0.0209 \\ 0.0114 & 0.0972 & -0.0137 & 0.0977 & -0.0022 & 0.0296 & -0.1109 & 0.0035 \\ -0.1240 & 0.0129 & 0.0706 & -0.0522 & -0.0303 & 0.0198 & 0.0726 & -0.0306 \end{bmatrix}$$

The number of bits set for each coefficient of the DCT matrix before quantization is as follows:

$$\begin{bmatrix} 6 & 10 & 11 & 7 & 6 & 8 & 8 & 7 \\ 11 & 9 & 11 & 8 & 6 & 4 & 10 & 6 \\ 7 & 9 & 6 & 9 & 10 & 3 & 3 & 8 \\ 7 & 7 & 6 & 8 & 9 & 6 & 4 & 6 \\ 10 & 7 & 10 & 9 & 10 & 7 & 7 & 6 \\ 6 & 6 & 7 & 6 & 4 & 7 & 9 & 8 \\ 6 & 7 & 6 & 6 & 6 & 7 & 9 & 7 \\ 10 & 7 & 5 & 9 & 8 & 6 & 7 & 10 \end{bmatrix}$$

The matrix of quantized 16-bit floating pointing coefficients F' having the fewest number of bits set while satisfying the constraint |F−F'|≦e, where e is the per frequency coefficient error tolerance given by paragraph [0037] is:

$$\begin{bmatrix} 9.6406 & -1.1475 & -0.4814 & 0.6729 & -0.2578 & -0.1680 & -0.0469 & 0.0781 \\ -1.8193 & 1.3252 & 0.3735 & -0.8203 & 0.4395 & 0.0664 & -0.0703 & -0.0977 \\ 0.5244 & -0.7930 & 0.1035 & 0.1230 & -0.2305 & -0.0078 & 0.1250 & 0.0234 \\ 0.1006 & -0.2705 & 0.3594 & 0.1738 & -0.2656 & 0.0313 & 0.1367 & 0.0156 \\ -0.4287 & 0.5371 & -0.0039 & -0.2969 & 0.2344 & -0.1016 & -0.0156 & 0.0156 \\ 0.3281 & -0.2598 & -0.2578 & 0.2031 & 0.0313 & 0.0313 & -0.0313 & -0.0195 \\ 0.0117 & 0.0977 & -0.0156 & 0.0977 & 0.0000 & 0.0313 & -0.1094 & 0.0000 \\ -0.1250 & 0.0117 & 0.0703 & -0.0508 & -0.0313 & 0.0156 & 0.0703 & -0.0313 \end{bmatrix}$$

The number of bits set for each coefficient of the quantized DCT matrix is as follows:

$$\begin{bmatrix} 6 & 10 & 10 & 7 & 5 & 6 & 4 & 4 \\ 11 & 9 & 10 & 7 & 6 & 4 & 5 & 6 \\ 6 & 8 & 6 & 8 & 7 & 2 & 2 & 3 \\ 7 & 7 & 6 & 5 & 5 & 2 & 4 & 2 \\ 10 & 6 & 4 & 6 & 5 & 6 & 3 & 2 \\ 5 & 6 & 5 & 4 & 2 & 2 & 3 & 4 \\ 2 & 5 & 3 & 5 & 0 & 2 & 6 & 0 \\ 3 & 2 & 4 & 5 & 3 & 2 & 4 & 3 \end{bmatrix}$$

The resulting quantization error for each coefficient is $$\begin{bmatrix} .000662 & .000185 & .000301 & .000041 & .000297 & .000491 & .002192 & .001822 \\ .000090 & .000087 & .000309 & .000325 & .000080 & .000027 & .001897 & .000016 \\ .000306 & .000403 & .000027 & .000245 & .000671 & .000490 & .000531 & .000868 \\ .000009 & .000088 & .000097 & .000864 & .000747 & .002381 & .000041 & .001282 \\ .000040 & .000478 & .000136 & .001761 & .000266 & .000144 & .002063 & .000474 \\ .000401 & .000038 & .001592 & .001235 & .000271 & .003107 & .002706 & .001397 \\ .000361 & .000482 & .001915 & .000039 & .002167 & .001650 & .001527 & .003546 \\ .000958 & .001197 & .000234 & .001384 & .000917 & .004194 & .002295 & .000657 \end{bmatrix}$$

For each DCT coefficient, the number of set bits reduced by quantization is $$\begin{bmatrix} 0 & 0 & 1 & 0 & 1 & 2 & 4 & 3 \\ 0 & 0 & 1 & 1 & 0 & 0 & 5 & 0 \\ 1 & 1 & 0 & 1 & 3 & 1 & 1 & 5 \\ 0 & 0 & 0 & 3 & 4 & 4 & 0 & 4 \\ 0 & 1 & 6 & 3 & 5 & 1 & 4 & 4 \\ 1 & 0 & 2 & 2 & 2 & 5 & 6 & 4 \\ 4 & 2 & 3 & 1 & 6 & 5 & 3 & 7 \\ 7 & 5 & 1 & 4 & 5 & 4 & 3 & 7 \end{bmatrix}$$

Note that the number of bits reduced by quantization is generally greater for high-frequency coefficients. Accordingly, a greater amount of compression may be obtained for the higher frequency components containing less important image information.

Using the quantization technique described herein, the degree of compression can be controlled by the base error tolerance parameter: it can be increased for greater compression and loss, and consequently smaller (but lower quality) image files, or decreased for less compression and larger, higher quality files. A further advantage is that during decompression, there is no dequantize step required as in JPEG (wherein the quantized values are multiplied by the quantization table elements), as the present technique does not perform quantization via division and rounding. Thus, the decoder implementation may be simplified.

With continued reference to FIG. 1, once the DCT coefficients of each 8×8 pixel data unit have been quantized at 140, the DC and the AC coefficients may then undergo lossless compression at 150. In one exemplary embodiment, the DC and AC components are compressed separately. Compression of the DC components is based on the observation that the DC coefficient of a data unit corresponds to the average value of all the original pixels in the data unit, and the average values of neighboring data units tend to be similar. Hence, the DC components of the data units may be encoded as the differences between the DC coefficients of consecutive data units, followed by zlib/Deflate compression. For the AC components, the coefficients are first reordered by scanning the data unit in zigzags from low to high spatial frequencies. The output sequence thus produced may then be run-length encoded to compress runs of zeros, and then further compressed, for example, using 16-bit Huffman coding. Those of ordinary skill in the art will recognize that the DC and AC coefficients need not be compressed separately, and that other data processing and lossless compression methods, such as arithmetic coding or the Lempel-Ziv compression schemes, may be used instead of, or in conjunction with, the methods described above.

It should be recognized that some of the acts/steps described in process 100 may be performed in different orders, may be optionally performed or not at all, or may be performed simultaneously. For example, the order of 110 and 120 may be interchanged or the steps may be performed simultaneously. Step 120, while generally desirable for achieving higher compression performance, need not be performed and may be skipped for grayscale images. It should also be recognized that process 100 may be preceded by any number of processes performed as part of the compression process for HDR images. Also, any number of processes may be performed subsequent to process 100 as part of the compression process for HDR images. For example, in one subsequent process, headers and compression parameters may be added to the compressed file. It should be recognized, however, that during decompression, there is no dequantize step required as in JPEG. As a result, unlike JPEG, quantization tables do not need to be added to the compressed file, thereby reducing memory storage and transmission bandwidth requirements. It is also contemplated that transformations or mappings other than the discrete cosine transform are possible at 140, for example, the wavelet transform or the Kahunen Loeve Transform.

Figure 3:
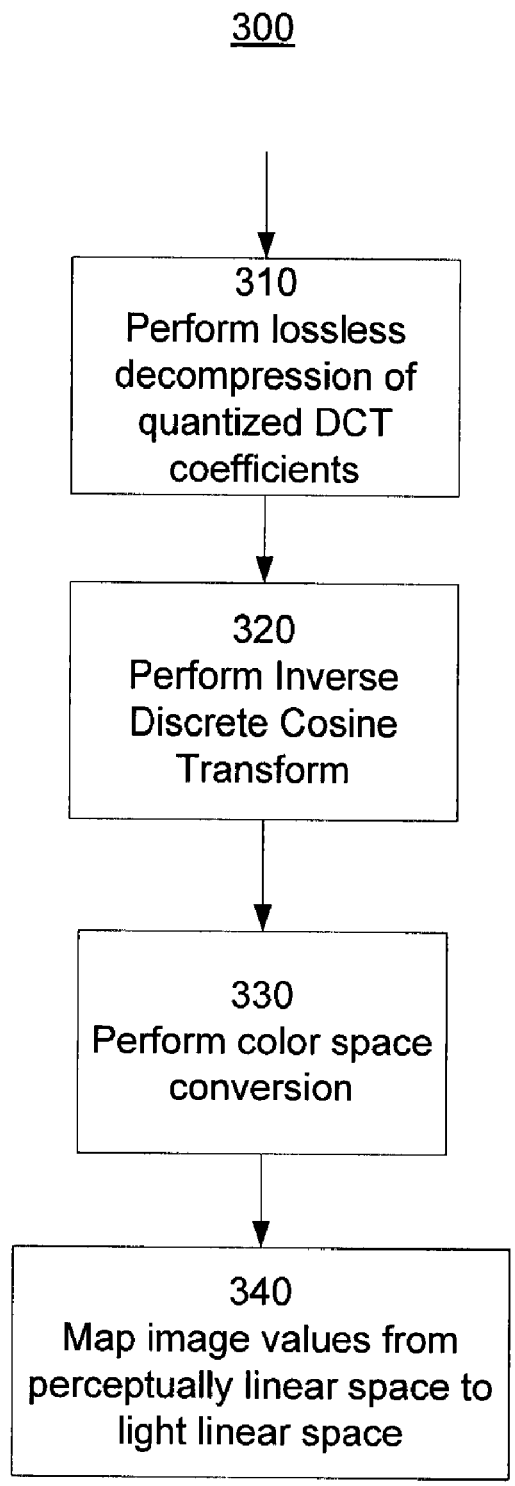
FIG. 3 illustrates an exemplary process for the decompression of compressed HDR images.

FIG. 3 illustrates an exemplary process 300 for decompressing a compressed image file that was created using the compression technique described above. At 310, lossless decompression of the quantized DCT coefficients is done by performing the inverse operations of 150. For example, if at 150, the AC coefficients underwent run-length encoding and Huffman encoding, then at 310 the AC coefficients of each data unit are computed by Huffman decoding and run-length decoding. Similarly, if at 150 the DC coefficients were encoded as differences and zip/Deflate compressed, then at 310 the DC coefficients are reconstructed by performing zip/Deflate decompression and then integration of the differences. If other lossless compression methods were used at 150, then the corresponding inverse methods are applied at 310. At 320, the inverse DCT is performed on each data unit. At 330, color space conversion may be performed to convert image data values, for example, from Y' CbCr space to R' G' B' space. At 340, the image values are mapped from perceptual linear space to light linear space by performing the inverse of the light linear to perceptual linear mapping function; for example, if the piecewise logarithmic and power function was used at 110, then the inverse of the piecewise logarithmic and power function is applied at 340.

A set of computer graphics rendered and photographic test images used for benchmarking the present compression and decompression techniques against two lossless compression techniques: OpenEXR ZIP-16 and OpenEXR PIZ. For testing purposes, the compression level of the present technique was set such that artifacts were not visible. Table 2 compares the performance of the three techniques based on their corresponding compressed file size. For each of the three techniques, the mean compressed file size is computed, then normalized by the mean compressed file size of the proposed technique.

TABLE 2

Mean normalized compressed file size
for rendered and photographic images

|  | Present Technique | Open-EXR PIZ | OpenEXR ZIP-16 |
|---|---|---|---|
| Computer Graphics Rendered Images | 1.0 | 3.94 | 3.55 |
| Photographic Images | 1.0 | 1.81 | 1.96 |

Table 3 compares the three techniques in terms of the mean amount of computational time it takes to compress a file (the mean encode time) and to decompress a file (the mean decode time), as benchmarked on the set of test images. The mean encode and decode times for the three techniques are normalized by the mean encode and decode times for the present technique, respectively.

TABLE 3

Normalized mean encode and decode
times for the three compression techniques

|  | Present Technique | Open-EXR PIZ | OpenEXR ZIP-16 |
|---|---|---|---|
| Mean Encode time | 1.0 | 0.66 | 1.93 |
| Mean Decode time | 1.0 | 3.33 | 2.33 |

Figure 4:
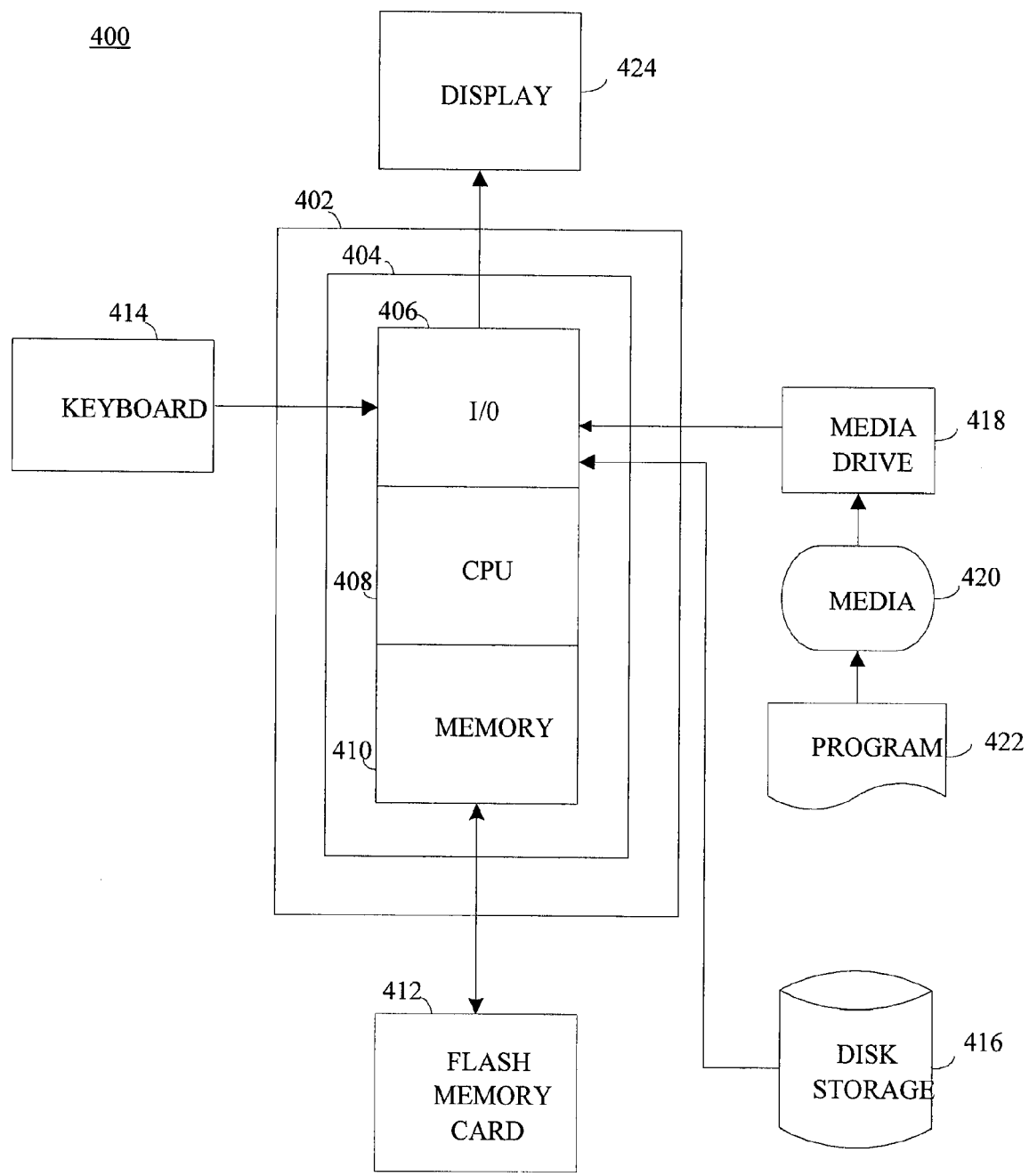
FIG. 4 illustrates an exemplary computing system.

FIG. 4 depicts an exemplary computing system 400 configured to perform any one of the above-described processes. In this context, computing system 400 may include, for example, a processor, memory, storage, and input/output devices (e.g., monitor, keyboard, disk drive, Internet connection, etc.). However, computing system 400 may include circuitry or other specialized hardware for carrying out some or all aspects of the processes. In some operational settings, computing system 400 may be configured as a system that includes one or more units, each of which is configured to carry out some aspects of the processes either in software, hardware, or some combination thereof.

FIG. 4 depicts an exemplary computing system 400 with a number of components that may be used to perform the above-described processes. The main system 402 includes a motherboard 404 having an input/output ("I/O") section 406, one or more central processing units ("CPU") 408, and a memory section 410, which may have a flash memory card 412 related to it. The I/O section 406 is connected to a display 424, a keyboard 414, a disk storage unit 416, and a media drive unit 418. The media drive unit 418 can read/write a computer-readable medium 420, which can contain programs 422 and/or data.

At least some values based on the results of the above-described processes can be saved for subsequent use. Additionally, a computer-readable medium can be used to store (e.g., tangibly embody) one or more computer programs for performing any one of the above-described processes by means of a computer. The computer program may be written, for example, in a general-purpose programming language (e.g., Pascal, C, C++) or some specialized application-specific language.

Although only certain exemplary embodiments have been described in detail above, those skilled in the art will readily appreciate that many modifications are possible in the exemplary embodiments without materially departing from the novel teachings and advantages of this invention. For example, aspects of embodiments disclosed above can be combined in other combinations to form additional embodiments. Accordingly, all such modifications are intended to be included within the scope of this invention.

What is claimed is:

1. A computer-enabled method of lossy compressing a high dynamic range (HDR) image, the method comprising:
   mapping floating point image data values of the HDR image from a light linear space to a perceptually linear space using a first non-linear mapping function, wherein a value in the light linear space is proportionate to the power of a light source, and wherein a value in the perceptually linear space is proportionate to a visual perceived brightness;
   determining floating point discrete cosine transform (DCT) frequency coefficients of the floating point image data values of the HDR image;
   quantizing the floating point DCT frequency coefficients;

compressing the quantized floating point DCT frequency coefficients, wherein the compression of the quantized floating point DCT frequency coefficients is lossless; and storing the compressed quantized floating point DCT frequency coefficients.

2. The method of claim 1, further comprising:
converting the floating point image data values of the HDR image from a first color space to a second color space prior to determining the floating point DCT frequency coefficients.

3. The method of claim 2, wherein the second color space is a Y' CbCr space comprising luma values and chroma values.

4. The method of claim 1, wherein the mapping function comprises a piecewise power function and a piecewise logarithmic function, the piecewise power function mapping a first range of input values using a power function, the piecewise logarithmic function mapping a second range of input values using a logarithmic function.

5. The method of claim 1, wherein quantizing the floating point DC frequency coefficients comprises:
quantizing a floating point DCT frequency coefficient to a floating point quantized DCT frequency coefficient within a per-frequency coefficient absolute error tolerance of the floating point DCT frequency coefficient.

6. The method of claim 5, wherein the per-frequency coefficient absolute error tolerance is computed by multiplying a base error tolerance by a per-frequency relative error tolerance.

7. The method of claim 6, wherein the per-frequency relative error tolerance is based on a DCT quantization table.

8. The method of claim 7, wherein the per-frequency relative error tolerance is computed by normalizing a DCT quantization table.

9. The method of claim 5, wherein quantizing the floating point DCT frequency coefficient further comprises:
selecting a floating point value having a minimal number of bits set to one.

10. The method of claim 9, wherein quantizing the floating point DCT frequency coefficient further comprises:
selecting a floating point value having the least quantization error.

11. The method of claim 5, wherein quantizing the floating point DCT frequency coefficient further comprises:
selecting a floating point value having a maximum number of bits set to one.

12. The method of claim 11, wherein quantizing the floating point DCT frequency coefficient further comprises:
selecting a floating point value having the least quantization error.

13. The method of claim 5, wherein quantizing the floating point DCT frequency coefficient further comprises:
looking up a pre-computed table.

14. The method of claim 1, further comprising:
decompressing the compressed quantized floating point DCT frequency coefficients, wherein the decompression is lossless;
converting the decompressed coefficients to a set of decompressed floating point image data values of the HDR image using a floating point inverse discrete cosine transform; and
mapping the set of decompressed floating point image data values of the HDR image from the perceptually linear space to the light linear space using a second non-linear mapping function, wherein the second non-linear mapping function is the inverse of the first non-linear mapping function.

15. A computer-enabled method of decompressing a lossy compressed high dynamic range (HDR) image, the method comprising:
obtaining compressed quantized floating point discrete cosine transform (DCT) frequency coefficients for the HDR image;
decompressing the compressed quantized floating point DCT frequency coefficients, wherein the decompression is lossless;
converting the decompressed coefficients to a set of decompressed floating point image data values of the HDR image using a floating point inverse discrete cosine transform; and
mapping the set of decompressed floating point image data values of the HDR image from the perceptually linear space to the light linear space using a second non-linear mapping function, wherein the second non-linear mapping function is the inverse of the first non-linear mapping function.

16. A non-transitory computer-readable storage medium comprising computer-executable instructions for lossy compressing a high dynamic range (HDR) image, the instructions comprising:
mapping floating point image data values of the HDR image from a light linear space to a perceptually linear space using a first non-linear mapping function, wherein a value in the light linear space is proportionate to the power of a light source, and wherein a value in the perceptually linear space is proportionate to a visual perceived brightness;
determining floating point discrete cosine transform (DCT) frequency coefficients of the floating point image data values of the HDR image;
quantizing the floating point DCT frequency coefficients;
compressing the quantized floating point DCT frequency coefficients, wherein the compression of the quantized floating point DCT frequency coefficients is lossless; and
storing the compressed quantized floating point DCT frequency coefficients.

17. The computer-readable storage medium of claim 16, further comprising instructions for:
converting the floating point image data values of the HDR image from a first color space to a second color space prior to computing the floating point DCT frequency coefficients.

18. The computer-readable storage medium of claim 16, wherein instructions for quantizing the floating point DCT frequency coefficients comprise instructions for:
quantizing a floating point DCT frequency coefficient to a floating point quantized DCT frequency coefficient within a per-frequency coefficient absolute error tolerance of the floating point DCT frequency coefficient.

19. The computer-readable storage medium of claim 16, further comprising instructions for:
decompressing the compressed quantized floating point DCT frequency coefficients, wherein the decompression is lossless;
converting the decompressed coefficients to a set of decompressed floating point image data values of the HDR image using a floating point inverse discrete cosine transform; and
mapping the set of decompressed floating point image data values of the HDR image from the perceptually linear space to the light linear space using a second non-linear mapping function, wherein the second non-linear mapping function is the inverse of the first non-linear mapping function.

* * * * *

UNITED STATES PATENT AND TRADEMARK OFFICE
CERTIFICATE OF CORRECTION

PATENT NO. : 8,340,442 B1
APPLICATION NO. : 12/705348
DATED : December 25, 2012
INVENTOR(S) : Karl Richard Rasche It is certified that error appears in the above-identified patent and that said Letters Patent is hereby corrected as shown below:

On Title page, item (56), under "OTHER PUBLICATIONS", in column 1, line 1, Delete "l'Eclairage" and insert -- l'Eclairage --, therefor.

In the Specification
In column 2, line 16, Delete "Rfal" and insert -- Rafal --, therefor.

In column 4, line 49, Delete "(X)" and insert -- (x) --, therefor.

In column 8, line 47, Delete "F—e" and insert -- F-e --, therefor.

In column 8, line 49, Delete "F—e" and insert -- F-e --, therefor.

In column 9, line 48, Delete " $F_{optimal}^{\prime}$ " and insert -- $F_{optimal}^{\prime}$ --, therefor.

In column 10, line 11, Delete " $F_{optimal}^{\prime}$ " and insert -- $F_{optimal}^{\prime}$ --, therefor.

In column 10, line 20, Delete " $F_{optimal}^{\prime}$ " and insert -- $F_{optimal}^{\prime}$ --, therefor.

In column 10, line 66, after "tolerance" delete "given by paragraph [0037]".

In column 13, line 9, Delete "Kahunen" and insert -- Karhunen --, therefor.

Signed and Sealed this
Fourth Day of June, 2013

Teresa Stanek Rea
*Acting Director of the United States Patent and Trademark Office*